(12) United States Patent
Ahmed et al.

(10) Patent No.: US 10,630,222 B2
(45) Date of Patent: Apr. 21, 2020

(54) SYSTEM HAVING ELECTRICAL MACHINE AND CONTROLLER

(71) Applicant: ABB Schweiz AG, Baden (CH)

(72) Inventors: Sara Ahmed, Morrisville, NC (US); Zhiguo Pan, Cary, NC (US); Hongrae Kim, Cary, NC (US)

(73) Assignee: ABB Schweiz AG, Baden (CH)

( * ) Notice: Subject to any disclaimer, the term of this patent is extended or adjusted under 35 U.S.C. 154(b) by 144 days.

(21) Appl. No.: 15/908,129

(22) Filed: Feb. 28, 2018

(65) Prior Publication Data
US 2018/0191287 A1 Jul. 5, 2018

Related U.S. Application Data

(63) Continuation of application No. PCT/IB2015/001986, filed on Aug. 29, 2015.

(51) Int. Cl.
| | |
|---|---|
| *H02P 27/04* | (2016.01) |
| *H02P 27/08* | (2006.01) |
| H02P 23/00 | (2016.01) |

(52) U.S. Cl.
CPC ............ *H02P 27/047* (2013.01); *H02P 27/08* (2013.01); *H02P 23/0077* (2013.01)

(58) Field of Classification Search
CPC ........ H02P 21/22; H02P 27/08; H02P 27/085; H02P 27/047
See application file for complete search history.

(56) References Cited

U.S. PATENT DOCUMENTS

| | | | | |
|---|---|---|---|---|
| 3,723,840 A | * | 3/1973 | Opal | H02P 27/06 318/432 |
| 3,743,906 A | | 7/1973 | Torok | |
| 3,819,992 A | * | 6/1974 | Opal | H02P 27/08 318/798 |
| 3,863,120 A | | 1/1975 | Rettig | |
| 5,206,575 A | * | 4/1993 | Nakamura | H02P 27/08 318/807 |

(Continued)

FOREIGN PATENT DOCUMENTS

| | | |
|---|---|---|
| CN | 102843090 A | 12/2012 |
| EP | 2892148 A1 | 7/2015 |

OTHER PUBLICATIONS

International Search Report and Written Opinion, Application No. PCT/IB2015/001986, dated Jun. 9, 2016, 11 pages.

(Continued)

*Primary Examiner* — Thai T Dinh
(74) *Attorney, Agent, or Firm* — Taft Stettinius & Hollister LLP; J. Bruce Schelkopf

(57) ABSTRACT

A unique system may include a power absorber; an electrical machine coupled to the power absorber and operative to supply mechanical power to the power absorber; a drive coupled to the electrical machine and operative to supply electrical power to drive the electrical machine; and a controller communicatively coupled to the drive. The controller may be configured to execute program instructions to selectively vary a control voltage while maintaining a given torque output of the electrical machine, and to determine, based on varying the control voltage, a minimum current required for the electrical machine to maintain the given torque output.

20 Claims, 3 Drawing Sheets

(56) References Cited

U.S. PATENT DOCUMENTS

| | | | |
|---|---|---|---|
| 6,570,358 B2* | 5/2003 | Nakatsugawa | H02P 6/16 318/490 |
| 6,650,083 B2 | 11/2003 | Jung | |
| 7,825,620 B2* | 11/2010 | Nakatsugawa | H02P 21/06 318/490 |
| 8,179,068 B2* | 5/2012 | Yuuki | H02K 1/2766 318/432 |
| 8,644,992 B2 | 2/2014 | Suel, II | |
| 8,884,576 B2* | 11/2014 | Yuuki | H02K 1/2766 318/718 |
| 9,054,615 B2* | 6/2015 | Head | H02P 27/047 |
| 2012/0280645 A1* | 11/2012 | Olsson | H02P 23/0077 318/802 |
| 2014/0139154 A1 | 5/2014 | Chuang et al. | |
| 2014/0217935 A1* | 8/2014 | Matsui | H02P 27/06 318/139 |

OTHER PUBLICATIONS

Zengcai Qu et al., "Loss-minimizing control of synchronous reluctance motors A review," Industrial Technology, (ICIT), IEEE, dated Feb. 25, 2013, pp. 350-355.

R.E. Betz et al., "Control of Synchronous Reluctance Machines," IEE Transactions on Industry Applications, vol. 29, No. 6, dated Nov./Dec. 1993, pp. 1110-1122.

Takayoshi Matsuo et al., "A New Control Strategy for Optimum-Efficiency Operation of a Synchronous Reluctance Motor," IEEE Transactions on Industry Applications, vol. 33, No. 5, dated Sep./Oct. 1997, pp. 1146-1153.

Akira Chiba et al., "A Closed-Loop Operation of Super High-Speed Reluctance Motor for Quick Torque Response," IEEE Transactions on Industry Applications, vol. 28, No. 3, dated May/Jun. 1992, pp. 600-606.

Ming-Yen Wei et al., "Design and Implementation of an Online Tuning Adaptive Controller for Synchronous Reluctance Motor Drives," IEEE Transactions on Industrial Electronics, vol. 60, No. 9, dated Sep. 2013, pp. 3644-3657.

Maarten J. Kamper et al., "Design and Performance of Compensated Reluctance Synchronous Machine Drive with Extended Constant Power Speed Range," IEEE, dated 2012, pp. 4330-4337.

R.E. Betz et al., "Aspects of the Control of Synchronous Reluctance Machines Including Saturation and Iron Losses," IEEE, dated Nov. 1992, pp. 456-463.

Roberto Morales-Caporal et al., "A Predictive Torque Control for the Synchronous Reluctance Machine Taking into Account the Magnetic Cross Saturation," IEEE Transactions on Industrial Electronics, vol. 54, No. 2, dated Apr. 2007, pp. 1161-1167.

Heath F. Hofmann et al., "Stator-Flux-Oriented Vector Control of Synchronous Reluctance Machines With Maximized Efficiency," IEEE Transactions on Industrial Electronics, vol. 51, No. 5, dated Oct. 2004, pp. 1066-1072.

Reza Rajabi Moghaddam et al., "New Theoretical Approach to the Synchronous Reluctance Machine Behavior and Performance," Proceedings of the 2008 International Conference on Electrical Machines, IEEE, dated 2008, pp. 1-6.

A. Kilthau et al., "Appropriate Models for the Control of the Synchronous Reluctance Machine," IEEE, dated 2002, pp. 2289-2295.

Ion Boldea et al., "A Class of Fast Dynamics V/f Sensorless AC General Drives with PM-RSM as a Case Study," 12th International Conference on Optimization of Electrical and Electronic Equipment, OPTIM, dated 2010, pp. 453-459.

H.W. De Kock et al., "Dynamic control of the permanent magnet-assisted reluctance synchronous machine," IEEE Electr. Power Appl., dated 2007, pp. 153-160.

R.E. Betz, "Theoretical aspects of control of synchronous reluctance machines," IEEE Proceedings—B, vol. 139, No. 4, dated Jul. 1992, pp. 355-364.

Mostafa A. Fellani et al., "Matlab/Simulink-Based Transient Stability Analysis of a Sensorless Synchronous Reluctance Motor," World of Academy Science, Engineering and Technology, vol. 4, dated Aug. 26, 2010, pp. 1230-1234.

Tian-Hua Liu, "Controller Design for Synchronous Reluctance Motor Drive Systems with Direct Torque Control," Torque Control, dated Feb. 2011, pp. 253-292.

* cited by examiner

1

SYSTEM HAVING ELECTRICAL MACHINE AND CONTROLLER

FIELD OF THE INVENTION

The present invention relates to systems powered by electrical machines, and more particularly to controllers for electrical machines.

BACKGROUND

Systems having electrical machines and controllers for controlling the electrical machines remain an area of interest. Some existing systems have various shortcomings, drawbacks and disadvantages relative to certain applications. For example, in some systems, electrical efficiency might be increased. Accordingly, there remains a need for further contributions in this area of technology.

SUMMARY

Embodiments of the present invention include a system. The system may include a power absorber; an electrical machine coupled to the power absorber and operative to supply mechanical power to the power absorber; a drive coupled to the electrical machine and operative to supply electrical power to drive the electrical machine; and a controller communicatively coupled to the drive. The controller may be configured to execute program instructions to selectively vary a control voltage while maintaining a given torque output of the electrical machine, and to determine, based on varying the control voltage, a minimum current required for the electrical machine to maintain the given torque output.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
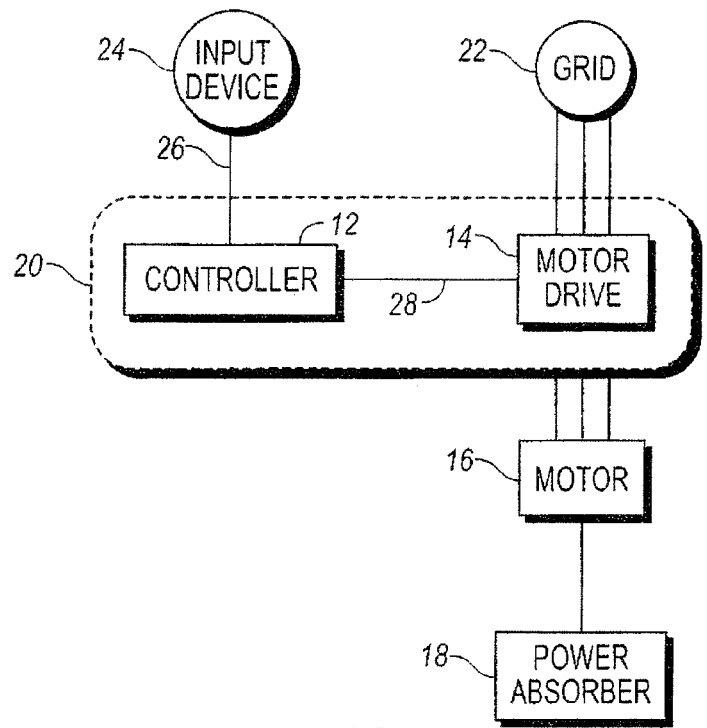
FIG. 1 schematically depicts some aspects of a system powered by an electrical machine in accordance with a non-limiting example of an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a system 10 in accordance with an embodiment of the present invention are schematically depicted. System 10 includes a controller 12; a drive 14, e.g., a motor drive; an electrical machine 16; and a power absorber 18. Controller 12 is communicatively coupled to motor drive 14. In some embodiments, controller 12 and motor drive 14 may be incorporated into a single electronics module 20. Motor drive 14 is electrically coupled to electrical machine 16 and to a power source 22, e.g., an electrical grid or other electrical power source. Motor drive 14 is operative to supply electrical power to electrical machine 16 under the direction of controller 12 using power obtained from power source 22 for electrically driving electrical machine 16 at a voltage and frequency that are based on user input supplied to controller 12. Electrical machine 16 converts the electrical power received from motor drive 14 into mechanical power at a desired frequency, e.g., a desired rotational speed of a shaft or other mechanical output feature of electrical machine 16.

Electrical machine 16 is mechanically coupled to power absorber 18. Electrical machine 16 is operative to supply mechanical power to power absorber 18 to operate power absorber 18. In one form, power absorber 18 is a fan. In other embodiments, power absorber 18 may be a pump, a compressor, a machine or vehicle drive system, or any other mechanically powered device or system. In one form, electrical machine 16 is a 3-phase motor. In other embodiments, electrical machine 16 may take one or more other forms, e.g., a single or multi-phase motor, a motor-generator, and in some embodiments, a generator. In one form, electrical machine 16 is a synchronous reluctance machine. In other embodiments, electrical machine 16 may be a permanent magnet synchronous machine, an interior permanent magnet machine, an induction motor, or another type of electrical machine.

Controller 12 is operative to receive a command signal input 26 from an input device 24. In one form input device 24 is a human user interface operative to receive user input, e.g., a manual input device. In other embodiments, input device 24 may be another form of input device, e.g., a computer or computer controlled input device. Controller 12 is operative to provide control signals to motor drive 14 based on the user interface 24 command signal 26, e.g., to provide pulse width modulation (PWM) gate drive signals 28, which are used by motor drive 14 in providing electrical power or drive signals to electrical machine 16 to electrically power electrical machine 16. In one form, command signal 26 is a command frequency, i.e., a desired frequency output of electrical machine 16. In other embodiments, other inputs may be supplied from user interface 24 to controller 12 in addition to or in place of a command frequency.

Figure 2:
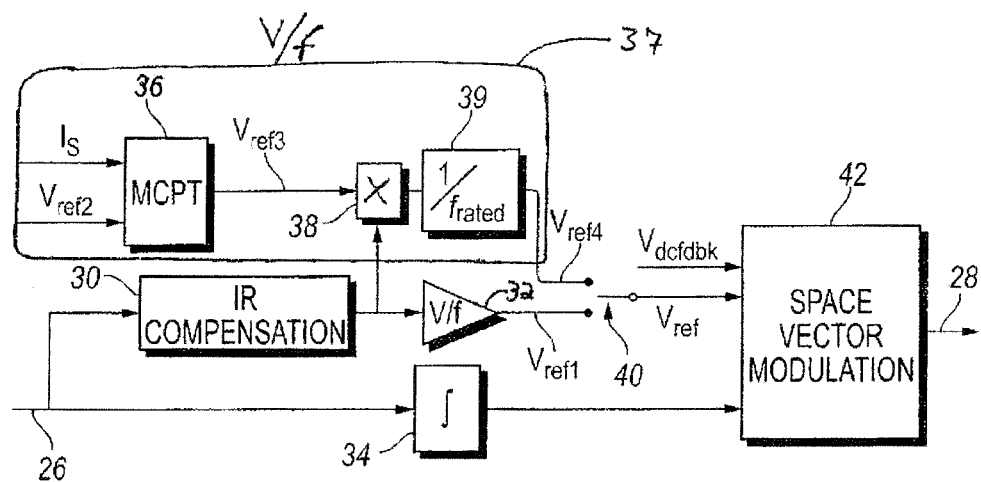
FIG. 2 schematically depicts some aspects of a controller in accordance with a non-limiting example of an embodiment of the present invention.

Referring to FIG. 2, some aspects of a non-limiting example of controller 12 in accordance with an embodiment of the present invention are schematically depicted. Controller 12 performs a modified scalar (V/f or V/Hz) control of drive 14 and hence electrical machine 16. Controller 12 includes an IR compensation module 30 (wherein "I" pertains to an electrical machine 16 current, and "R" pertains to an electrical machine 16 resistance); a V/f module 32, an integration module 34; a minimum current point tracking (MCPT) module 36; a multiplier module 38; a 1/frated gain module 39; a switch 40 and a space vector modulation (SVM) module 42. Modules 36, 38 and 39 may be understood as part of a V/f module 37. In one form, controller 12 is microprocessor based and the program instructions are in the form of software stored in a memory (not shown). However, it is alternatively contemplated that the controller and program instructions may be in the form of any combination of software, firmware and hardware, including state machines, and may reflect the output of discrete devices and/or integrated circuits, which may be co-located at a particular location or distributed across more than one location, including any digital and/or analog devices configured to achieve the same or similar results as a processor-based controller executing software and/or firmware and/or hardware based instructions.

IR compensation module 30 is communicatively coupled to input device 24, and receives command frequency 26 as an input. IR compensation module 30 is also communicatively coupled to V/f module 32. The output of IR compensation module 30 is a frequency, e.g., Hz, which is outputted to V/f module 32. IR compensation module 30 is configured to increase the command frequency 26 by a predetermined amount or schedule of amounts (e.g., an amount which varies depending upon the magnitude of command frequency 26) when command frequency 26 is relatively low, e.g., near zero. The increase in frequency is configured to compensate for resistive losses and produce more magnetizing current in electrical machine 16 during low frequency operation, where resistive loses are higher than at higher frequency operation. At higher frequencies, IR compensation module 30 may not increase the command frequency. Hence, the frequency output of IR compensation module 30 may be the same as command frequency 26 or may be greater than command frequency 26, depending on the magnitude of command frequency 26. Some embodiments may not include an IR compensation module.

V/f module 32 is selectively communicatively coupled to SVM module 42 via switch 40. That is, during some modes of operation, V/f module 32 is communicatively coupled to SVM module 42 via switch 40, whereas in other modes of operation, V/f module 32 may be electrically or functionally disconnected from SVM module 42 by switch 40. V/f module 32 is configured to multiply the frequency output of IR compensation module 30 by the rated flux (V/f or V/Hz) to achieve an output control voltage or reference voltage, Vref1. In one form, the rated flux is the electrical machine 16 rated or nameplate voltage divided by the rated or nameplate frequency, e.g., in one non-limiting example, 380 V and 50 Hz. In other embodiments, V/f module 32 may be configured to multiply the frequency output of IR compensation module 30 by another flux value to achieve the output reference voltage, Vref1. Vref1 is supplied to switch 40, and hence to SVM module 42 when switch 40 closes to complete the electrical circuit path between V/f module 32 and SVM module 42. When switch 40 is closed to complete the electrical circuit path between V/f module 32 and SVM module 42, controller 12 is operating in a constant or fixed flux mode based on rated voltage. The fixed flux control path extends from IR compensation module 30 to V/f module 32 and then to SVM module 42.

Integration module 34 is communicatively coupled to input device 24, and receives command frequency 26 as an input. Integration module 34 is also communicatively coupled to SVM module 42. Integration module 34 is configured to integrate command frequency 26 to obtain an electrical angle, which is outputted to SVM module 42.

MCPT module 36 is communicatively coupled to module 38. MCPT module 36 receives as an input an electrical machine 16 phase current, Is, e.g., one of the phase currents for a 3-phase machine, such as either Ia, Ib or Ic. The phase current may be obtained, for example, from the output of motor drive 14, e.g., a measured or calculated phase current. MCPT module 36 also receives as an input Vref2. In one form, Vref2 is the same as Vref4 as outputted by module 37. As will be further apparent from the following description, Vref4 may be fed back to MCPT module 36 or Vref2 otherwise based directly upon Vref4 The output of MCPT module 36 is a voltage Vref3 which is supplied as an input to module 38.

Module 38 is communicatively coupled to IR compensation module 30 in addition to MCPT module 36, and receives as an input the frequency output of IR compensation module 30. Modules 38 and 39 are configured respectively to multiply the voltage output Vref3 of MCPT module 36 by the frequency output of IR compensation module 30, and to divide the product of the multiplication by the rated or nameplate frequency of electrical machine 16, to achieve reference voltage Vref4. The order of arithmetic operations could as well be reversed and/or additional or alternative calculations to obtain Vref4 could be used.

Controller 12 is configured to execute program instructions to vary the MCPT module 36 inputted voltage Vref2 based on a previously calculated Vref4 and iteratively determine, an updated voltage Vref4 associated with a minimum current in electrical machine 16 to maintain a given torque output or torque output within a desired tolerance band or torque ripple. Another way to understand the operations of controller 12 is that controller 12 can calculate in a generally closed loop fashion, a Vref4 input to SVM module 42 that achieves a minimum current in electrical machine 16 that is sufficient to maintain the given or desired torque output of electrical machine 16. Vref2 is thus varied to achieve varying values of Vref4. Is varies with Vref4 (when operating in a variable flux mode), and Vref2 is varied in order to obtain a value of Vref4 associated with the minimum phase current Is on the fly, that is, while electrical machine 16 is operating and maintaining the desired torque output. The operation of MCPT module 36 is discussed in greater detail subsequently.

Module 38 is selectively communicatively coupled to SVM module 42 via switch 40. That is, during some modes of operation, module 38 is communicatively coupled to SVM module 42 via switch 40, whereas in other modes of operation, module 38 may be electrically or functionally disconnected from SVM module 42. In one form, when the output Vref4 of module 38 exceeds the output Vref1 of V/f module 32, switch 40 opens the electrical circuit path between module 38 and SVM module 42, preventing communication between module 38 and SVM module 42. In this mode, switch 40 also closes to complete the electrical circuit path between V/f module 32 and SVM module 42, thus supplying the original, unmodified Vref1 as an input Vref to SVM module 42, operating in the fixed flux mode.

Conversely, when the output Vref4 of module 38 does not exceed the output Vref1 of module 32, switch 40 closes the electrical circuit path between module 38 and SVM module 42 to supply the output Vref4 of module 38 as an input Vref to SVM module 42, thus operating electrical machine 16 in a variable flux mode. In this mode, switch 40 also opens to break the electrical circuit path between module 32 and SVM module 42, preventing communication between module 32 and SVM module 42. The variable flux path extends through MCPT module 36 and module 38. The variable flux mode is termed "variable" because the voltage applied as input to module 38 is varied by MCPT module 36, whereas in fixed flux operation, the voltage employed in module 32 is a fixed value, e.g., nameplate or rated voltage.

SVM module 42 is communicatively coupled to motor drive 14. SVM module 42 is communicatively coupled to switch 40, and receives as an input Vref, as described above, which may be either Vref1 or Vref4. In addition, SVM module 42 receives as an input the electrical angle outputted by integration module 34, as well as a DC feedback voltage, Vdcfdbk, received from motor drive 14, e.g., a DC bus (not shown) voltage that supplies power to an inverter (not shown) of motor drive 14. SVM module 42 is configured to generate PWM gate drive signals 28 based on Vref, the electrical angle output of integration module 34 and Vdcfdbk, which are supplied from SVM module 42 to motor drive 14.

Figure 3:
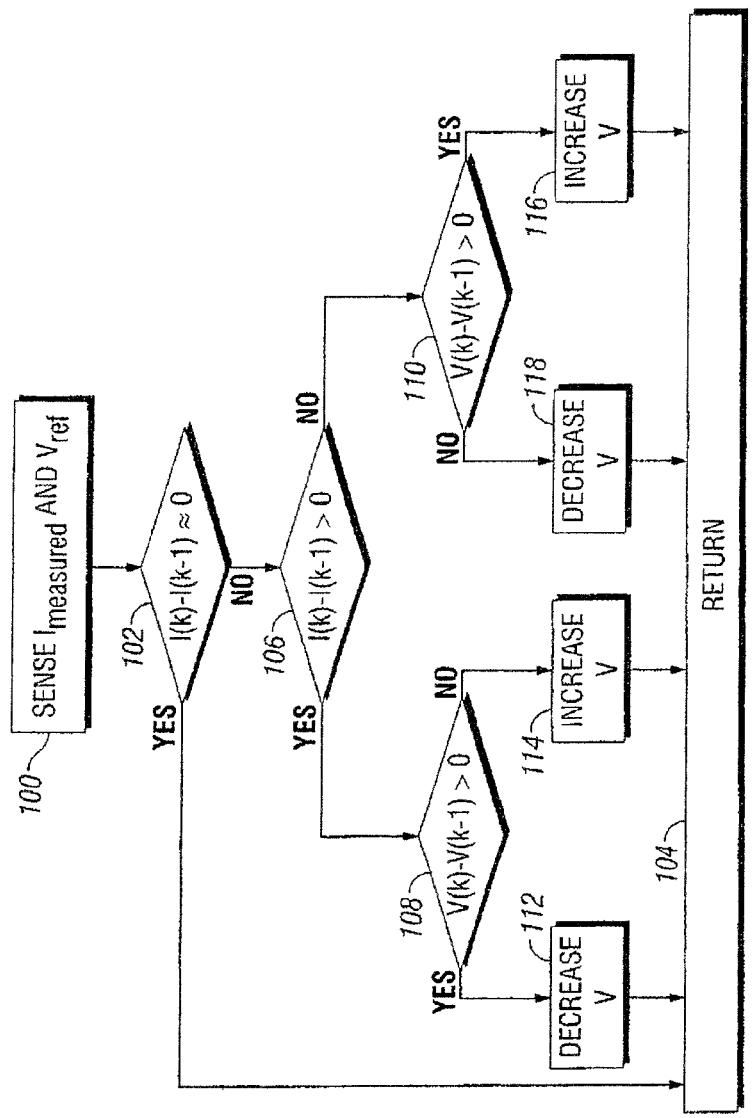
FIG. 3 schematically depicts some aspects of a method for controlling an electrical machine in accordance with a non-limiting example of an embodiment of the present invention.
Figure 4:
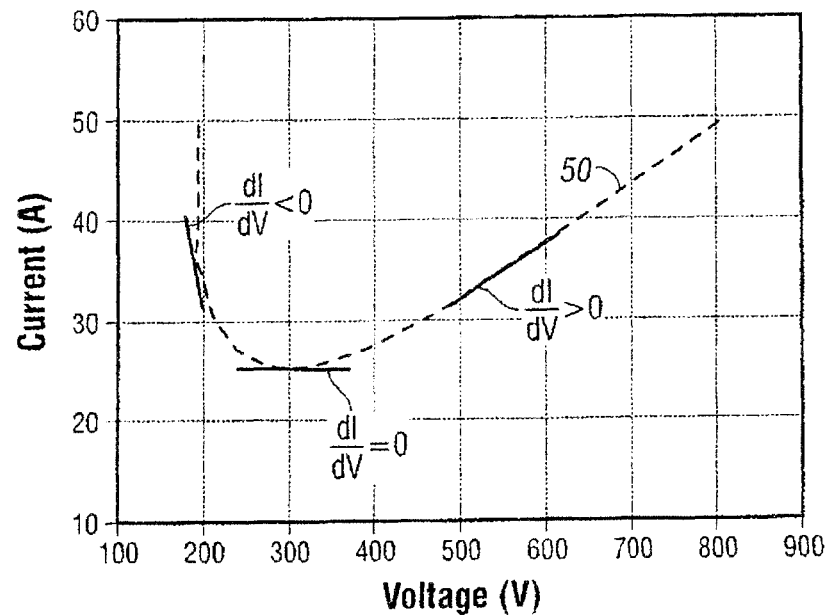
FIG. 4 depicts some aspects of a current-voltage curve of an electrical machine in accordance with a non-limiting example of an embodiment of the present invention.

Referring to FIGS. 3 and 4, some aspects of a non-limiting example of a method for controlling an electrical machine in accordance with an embodiment of the present invention are depicted. The operation of system 10 is initiated via a frequency command 26 transmitted from input device 24 to controller 12. The frequency command is received into IR compensation module 30, the output of which is supplied to module 32, which generates Vref1. The frequency command is integrated by integration module 34 to generate an electrical angle, which is input into SVM 42. Vdcdfbk is also input into SVM 42 from the DC bus of drive 14. A DC voltage sensor (not shown) may be coupled with the DC bus so as to provide the output Vdcdfbk.

The process illustrated in FIG. 3 is a minimum current point tracking method performed by MCPT module 36, initiated when a frequency command 26 is received. The process is repeated at a predetermined frequency, e.g., 0.5 seconds. If the process results in a Vref4 value that exceeds Vref1, switch 40 is engaged to complete the circuit path from module 32 to SVM module 42 (and disengage the circuit path from module 38 to SVM module 42). Otherwise, switch 40 is engaged to complete the circuit path from module 38 to SVM module 42 (and disengage the circuit path from module 32 to SVM module 42). In one form, the process of FIG. 3 is repeated or iterated continuously while electrical machine 16 is running, e.g., so that the minimum current is sought by controller 12 after changes in load on electrical machine 16 and/or changes in command frequency 26. In other embodiments, the process may be stopped, e.g., when Vref4 reaches a value associated with the minimum current Is required to maintain some desired torque output of electrical machine 16, or until Vref4 exceeds Vref1. In some embodiments, the process begins again if the commanded frequency changes. In some embodiments, the process begins again when the demand or load imposed upon electrical machine 16 by power absorber 18 changes. It should also be appreciated that while controlling to determine and produce the minimum current needed to maintain the given output torque is expected to be a practical implementation strategy, in some instances a target reduced current different from the minimum current might be sought. For instance, rather than an absolute minimum current, controller 12 could operate to determine a Vref4 that results in 101% of the minimum current, 105%-110% of the minimum current, or still another range or value.

The process of FIG. 3 is performed while electrical machine 16 is operating and maintaining a given or desired torque load transmitted to power absorber 18. The characteristics of electrical machine 16 include an I-V relationship or current-voltage curve for each torque value output by electrical machine 16, an example of which is illustrated as I-V curve 50 in FIG. 4. The shape and/or position of the I-V curve varies with electrical machine 16 torque output.

Controller 12 executes program instruction at block 100 to sense or otherwise determine Vref1 and Is at MCPT module 36. In the depiction of FIG. 3 and the below description, "k" refers to a current iteration through the process of FIG. 3, whereas "k−1" refers to a previous iteration through the process of FIG. 3; "I" refers to a sensed or calculated "Is;" and "V" refers to Vref4. "Is" may be either Ia, Ib or Ic. For example, in some embodiments, Ia, and Ib may be sensed phase currents, whereas Ic may be determined based on an equation wherein the sums of Ia, Ib and Ic equals zero or approximately zero. For the first iteration through the process of FIG. 3, in some embodiments, initial current and voltage values for iteration k−1 may be employed that differ from the sensed values of block 100 by predetermined amounts in order to ensure that the process of FIG. 3 begins a search for the value of Vref4 associated with the minimum current Is required to maintain the desired torque output of electrical machine 16. Typically, the first iteration of the process of FIG. 3 commences with Vref2 being equal to rated voltage for the electrical machine.

At block 102, controller 12 executes program instructions to determine whether the phase current of the present iteration, I(k), is approximately the same as the phase current Is of the previous iteration, I(k−1), e.g., by comparing the phase current values, e.g., by subtracting I(k−1) from I(k). The previous iteration phase current, I(k−1), is the electrical machine 16 phase current stemming from or associated with the previous iteration's voltage, V(k−1), whereas the present iteration current, I(k), is the electrical machine 16 phase current stemming from or associated with the present iteration voltage, V(k). If the results of the comparison are approximately zero, i.e., zero within some predetermined tolerance band or limit, ΔI (delta current) is considered to be zero, and hence dI/dV is considered to be zero, as illustrated in FIG. 4. In such case, the current value of Vref4 is considered to be the voltage associated with the minimum current Is. Process flow then proceeds to block 104, which returns processing to block 100. If the results of the comparison are nonzero, process flow proceeds to block 106.

At block 106, controller 12 executes program instructions to compare phase currents to determine whether the phase current of the present iteration is greater than or is less than the phase current of the previous iteration. This determination is made, for example, by subtracting I(k−1) from I(k), and determining whether the result of the subtraction is greater than zero. If so, then I(k) is greater than I(k−1), and ΔI is positive, in which case process flow proceeds to block 108. Otherwise, I(k) is less than I(k−1), and ΔI is thus negative, in which case process flow proceeds to block 110.

At block 108, controller 12 executes program instructions to compare voltage of the current iteration with voltage of the previous iteration, e.g., by subtracting V(k−1) from V(k), and determining whether the result of the subtraction is greater than zero. If the result is positive, then ΔV (delta voltage) is positive, and process flow proceeds to block 112, wherein the voltage output supplied as Vref4 (and inputted into SVM 42 as Vref) is decreased by a predetermined amount. The voltage is decreased because ΔI of block 106 is positive, and ΔV is also positive, yielding a positive current-voltage slope (dI/dV>0), which requires, for a typical motor current-voltage curve 50, e.g., as illustrated in FIG. 4, that voltage be decreased in order to find the minimum current value, at which dI/dV=0. Process flow then proceeds to block 104, which returns process flow to block 100.

If the result of the subtraction is negative, ΔV is negative, process flow proceeds to block 114, wherein the voltage output Vref3 is increased, such as by a predetermined amount. The voltage is increased in this case because the ΔI of block 106 is positive, whereas the ΔV is negative, yielding a negative current-voltage slope (dI/dV<0), which requires, for a typical motor voltage-current curve 50, e.g., as illustrated in FIG. 4, that voltage be increased in order to find the minimum current value, at which dI/dV=0. Process flow then proceeds to block 104, which returns process flow to block 100.

At block 110 (negative ΔI determined at block 106), controller 12 executes program instructions to compare voltage of the current iteration with voltage from the previous iteration by subtracting V(k−1) from V(k), and determining whether the result of the subtraction is greater than zero. If the result is positive, then ΔV is positive, and process flow proceeds to block 116, wherein the voltage output Vref3 is increased, such as by a predetermined amount. The voltage is increased because ΔI of block 106 is negative, whereas ΔV is positive, yielding a negative current-voltage slope (dI/dV<0), which requires, for a typical motor current-voltage curve 50, e.g., as illustrated in FIG. 4, that voltage be increased in order to find the minimum current value, at which dI/dV=0. Process flow then proceeds to block 104, which returns process flow to block 100.

If the result of the subtraction is negative, ΔV is negative, and process flow proceeds to block 118, wherein the voltage output Vref3 is decreased by a predetermined amount. The voltage in this case is decreased because ΔI of block 106 is negative, and ΔV is also negative, yielding a positive current-voltage slope (dI/dV>0), which requires, for a typical motor voltage-current curve 50, e.g., as illustrated in FIG. 4, that voltage be decreased in order to find the minimum current value, at which dI/dV=0. Process flow then proceeds to block 104, which returns process flow to block 100.

The process flow of FIG. 3 continues until the minimum current for a given electrical machine 16 output torque is achieved. In some embodiments, the process may run continuously, so that the minimum current value may be achieved after changes in command frequency or changes in the load imposed by power absorber 16.

Figure 5:
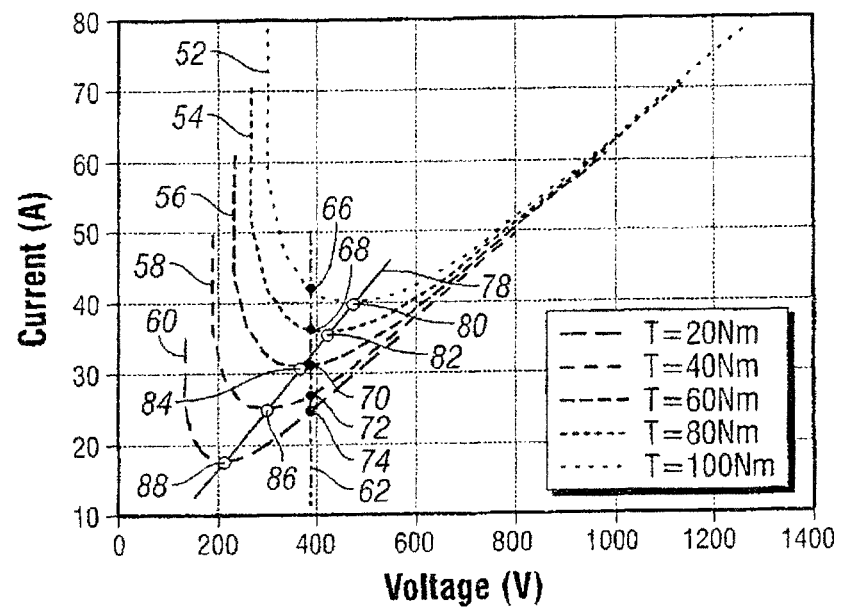
FIG. 5 depicts some aspects of a current-voltage curve of an electrical machine in accordance with a non-limiting example of an embodiment of the present invention.

Referring to FIG. 5, a plurality of current-voltage curves for an electrical machine are depicted. I-V curves 52, 54, 56, 58 and 60 correspond to a plurality of torque values, e.g., 100 Nm, 80 Nm, 60 Nm, 40 Nm and 20 Nm, respectively, for a non-limiting example of electrical machine 16. For systems that do not employ MCPT module 36 and the minimum current point tracking associated therewith, the electrical machine operates with a fixed flux along a rated voltage curve 62, which is a constant voltage curve at rated voltage. The electrical machine operating points are defined as the intersections 66, 68, 70, 72 and 74 of voltage curve 62 with I-V curves 52, 54, 56, 58 and 60. By implementing the minimum current point tracking associated with MCPT module 36 in controller 12, e.g., as illustrated in and described with respect to FIG. 3, electrical machine 16 operates along a variable flux curve 78. Variable flux curve 78 is not a constant voltage curve. Rather, during the operation of electrical machine 16, the voltage is varied under the direction of controller 12, in particular, MCPT module 36, to find the minimum current point for each I-V curve at which electrical machine 16 is operating, that is, the minimum current required for electrical machine 16 to maintain the given torque output associated with the particular I-V curve. The minimum current points represent the locations on each of I-V curves 52, 54, 56, 58 and 60 where dI/dV is zero or approximately zero, e.g., within some predetermined limits, and are illustrated as points 80, 82, 84, 86 and 88. Variable flux voltage curve 78 is defined as the line or curve that passes through the minimum current points for reach I-V curve, e.g., minimum current points 80, 82, 84, 86 and 88. Thus, under the direction of controller 12, in particular, in response to the algorithm executed by MCPT module 36, e.g., as set forth in FIG. 3, electrical machine 16 operates along variable flux voltage curve 78, as opposed to rated voltage curve 62. Whereas rated voltage curve 62 may yield a minimum current value for some particular nominal electrical machine 16 torque output value or I-V curve, variable flux voltage curve 78 represents the minimum current draw for each electrical machine 16 torque output value or I-V curve. Accordingly, under the direction of controller 12, electrical machine 16 may be operated at minimum current for a plurality or range of output torque values.

Embodiments of the present invention include a system, comprising: a power absorber; an electrical machine coupled to the power absorber and operative to supply mechanical power to the power absorber; a drive coupled to the electrical machine and operative to supply electrical power to drive the electrical machine; and a controller communicatively coupled to the drive and configured to execute program instructions to selectively vary a control voltage while maintaining a given torque output of the electrical machine, and to determine, based on varying the control voltage, a minimum current required for the electrical machine to maintain the given torque output.

In a refinement, the controller is configured to provide pulse width modulation gate drive signals to the drive based on the voltage associated with the minimum current.

In another refinement, the controller is configured to determine a slope in a current-voltage relationship for the electrical machine, and if the determined slope is positive, to reduce the control voltage until the slope is approximately zero.

In yet another refinement, the controller is configured to determine a slope in a current-voltage relationship for the electrical machine, and if the determined slope is negative, to increase the control voltage until the slope is approximately zero.

In still another refinement, the controller is configured to execute program instructions to selectively increase or decrease a first voltage to achieve a second voltage while maintaining the given torque output.

In yet still another refinement, the controller is configured to execute program instructions to determine a first current at the first voltage; determine a second current at the second voltage; and compare the second current with the first current.

In a further refinement, the controller is configured to execute program instructions to determine, based on the comparison, whether to increase the voltage to achieve a third current lower than the second current; or to decrease the voltage to achieve the third current lower than the second current.

In a yet further refinement, the controller is configured to selectively operate the electrical machine at a variable flux or a fixed flux.

In a still further refinement, the electrical machine has a current-voltage relationship for the torque output, and wherein the controller is configured to selectively increase or decrease the voltage until a first derivative of the current-voltage relationship is zero or approximately zero.

Embodiments of the present invention include a method for controlling an electrical machine, comprising: varying a voltage used to control the electrical machine while maintaining a given torque output by the electrical machine to obtain a plurality of voltages; determining a current in the electrical machine for each voltage of the plurality of voltages while maintaining the given torque output; determining a voltage of the plurality of voltages associated with the lowest determined current; and supplying the selected voltage as a reference voltage to a drive used to electrically power the electrical machine.

In a refinement, the method further comprises providing pulse width modulation gate drive signals to the drive based on the reference voltage.

In another refinement, the varying of the voltage and the determining of the current include: determining a first current in the electrical machine using a first voltage to control the electrical machine at the given torque output; selectively increasing or decreasing the first voltage to achieve a second voltage while maintaining the given torque output; and determining a second current in the electrical machine while using a second voltage to control the electrical machine and maintain the given torque.

In yet another refinement, the method further comprises comparing the second current with the first current.

In still another refinement, the method further comprises supplying the first voltage or the second voltage as the reference voltage to the drive if the comparison yields a substantially zero result.

In yet still another refinement, the method further comprises determining a slope in a current-voltage relationship for the electrical machine, and if the determined slope is positive, reducing the voltage until the slope is approximately zero.

In a further refinement, the method further comprises determining a slope in a current-voltage relationship for the electrical machine, and if the determined slope is negative, increasing the voltage until the slope is approximately zero.

Embodiments of the present invention include a system, comprising: a power absorber; an electrical machine coupled to the power absorber and operative to supply mechanical power to the power absorber; a motor drive coupled to the electrical machine and operative to supply electrical power to drive the electrical machine; and a controller communicatively coupled to the drive and configured to execute program instructions to: determine a current in the electrical machine while operating the electrical machine at a given torque output using a control voltage; adjust the voltage; determine a second current in the electrical machine while operating at the adjusted voltage and the given torque output; and repeat the adjusting of the voltage and the determining of the current until a target reduced current required for the electrical machine to maintain the given torque output is reached.

In a refinement, the controller is configured to execute program instructions to find the minimum current by successively reducing or increasing the voltage until the current stops decreasing.

In another refinement, the controller is configured to determine a slope in a current-voltage relationship for the electrical machine, and if the determined slope is positive, to reduce the control voltage until the slope is approximately zero.

In still another refinement, the controller is configured to determine a slope in a current-voltage relationship for the electrical machine, and if the determined slope is negative, to increase the control voltage until the slope is approximately zero.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system, comprising:
a power absorber;
an electrical machine coupled to the power absorber and operative to supply mechanical power to the power absorber;
a drive coupled to the electrical machine and operative to supply electrical power to drive the electrical machine; and
a controller communicatively coupled to the drive and configured to selectively vary a control voltage in a variable flux control path while maintaining a given torque output of the electrical machine, and to determine, based on varying the control voltage, a minimum current required for the electrical machine to maintain the given torque output, wherein the controller includes a fixed flux control path, and the controller is configured to control a switch to switch from the fixed flux control path to the variable flux control path in response to a first reference voltage from the fixed flux control path being greater than a second reference voltage from the variable flux control path, and to switch from the variable flux control path to the fixed flux control path in response to the first reference voltage being less than the second reference voltage.

2. The system of claim 1, wherein the controller is configured to provide pulse width modulation gate drive signals to the drive based on the voltage associated with the minimum current.

3. The system of claim 1, wherein the controller is configured to determine a slope in a current-voltage relationship for the electrical machine, and if the determined slope is positive, to reduce the control voltage until the slope is approximately zero.

4. The system of claim 1, wherein the controller is configured to determine a slope in a current-voltage relationship for the electrical machine, and if the determined slope is negative, to increase the control voltage until the slope is approximately zero.

5. The system of claim 1, wherein the controller is configured to selectively increase or decrease a first voltage to achieve a second voltage while maintaining the given torque output.

6. The system of claim 5, wherein the controller is configured to determine a first current at the first voltage; determine a second current at the second voltage; and compare the second current with the first current.

7. The system of claim 6, wherein the controller is configured to determine, based on the comparison, whether to increase the second voltage to achieve a third current lower than the second current; or to decrease the second voltage to achieve the third current lower than the second current.

8. The system of claim 1, wherein the controller is configured to selectively operate the electrical machine at a variable flux or a fixed flux.

9. The system of claim 1, wherein the electrical machine has a current-voltage relationship for the torque output, and wherein the controller is configured to selectively increase or decrease the voltage until a first derivative of the current-voltage relationship is zero or approximately zero.

10. A method for controlling an electrical machine, comprising:
varying a voltage used to control the electrical machine while maintaining a given torque output by the electrical machine to obtain a plurality of voltages;
determining a current in the electrical machine for each voltage of the plurality of voltages while maintaining the given torque output;
determining a voltage of the plurality of voltages associated with the lowest determined current;
supplying the selected voltage as a first reference voltage from a variable flux control path to a drive used to electrically power the electrical machine in response to the first reference voltage being less than a second reference voltage, wherein the second reference voltage is associated with a fixed flux control path; and
switching from the variable flux control path to the fixed flux control path in response to the first reference voltage being greater than the second reference voltage to supply the second reference voltage to the drive to electrically power the electrical machine from the fixed flux control path.

11. The method of claim 10, further comprising providing pulse width modulation gate drive signals to the drive based on the reference voltage.

12. The method of claim 10, wherein the varying of the voltage and the determining of the current include: determining a first current in the electrical machine using a first voltage to control the electrical machine at the given torque output; selectively increasing or decreasing the first voltage to achieve a second voltage while maintaining the given torque output; and determining a second current in the electrical machine while using a second voltage to control the electrical machine and maintain the given torque.

13. The method of claim 12, further comprising comparing the second current with the first current.

14. The method of claim 13, further comprising supplying the first voltage or the second voltage as the reference voltage to the drive if the comparison yields a substantially zero result.

15. The method of claim 10, further comprising determining a slope in a current-voltage relationship for the electrical machine, and if the determined slope is positive, reducing the voltage until the slope is approximately zero.

16. The method of claim 10, further comprising determining a slope in a current-voltage relationship for the electrical machine, and if the determined slope is negative, increasing the voltage until the slope is approximately zero.

17. A system, comprising:
a power absorber;
an electrical machine coupled to the power absorber and operative to supply mechanical power to the power absorber;
a motor drive coupled to the electrical machine and operative to supply electrical power to drive the electrical machine; and
a controller coupled to the drive and including a variable flux control path configured to: determine a current in the electrical machine while operating the electrical machine at a given torque output using a control voltage; adjust the voltage; determine a second current in the electrical machine while operating at the adjusted voltage and the given torque output; and repeat the adjusting of the voltage and the determining of the current until a target reduced current required for the electrical machine to maintain the given torque output is reached, wherein the controller further includes a fixed flux control path configured to determine a first reference voltage, and to control a switch to switch from the fixed flux control path to the variable flux control path in response to the first reference voltage from the fixed flux control path being greater than a second reference voltage from the variable flux control path, and to switch from the variable flux control path to the fixed flux control path in response to the first reference voltage being less than the second reference voltage.

18. The system of claim 17, wherein the target reduced current includes a minimum current required to maintain the given torque output, and wherein the controller is configured to find the minimum current by successively reducing or increasing the voltage until the current stops decreasing.

19. The system of claim 17, wherein the controller is configured to determine a slope in a current-voltage relationship for the electrical machine, and if the determined slope is positive, to reduce the control voltage until the slope is approximately zero.

20. The system of claim 17, wherein the controller is configured to determine a slope in a current-voltage relationship for the electrical machine, and if the determined slope is negative, to increase the control voltage until the slope is approximately zero.

* * * * *